United States Patent
Liu et al.

(10) Patent No.: US 10,196,502 B2
(45) Date of Patent: Feb. 5, 2019

(54) RESIN COMPOSITION AND USES OF THE SAME

(71) Applicant: TAIWAN UNION TECHNOLOGY CORPORATION, Chupei, Hsinchu County (TW)

(72) Inventors: Shur-Fen Liu, Chupei (TW); Meng-Huei Chen, Chupei (TW)

(73) Assignee: TAIWAN UNION TECHNOLOGY CORPORATION, Chupei (TW)

(*) Notice: Subject to any disclaimer, the term of this patent is extended or adjusted under 35 U.S.C. 154(b) by 62 days.

(21) Appl. No.: 15/174,270

(22) Filed: Jun. 6, 2016

(65) Prior Publication Data

US 2017/0260367 A1    Sep. 14, 2017

(30) Foreign Application Priority Data

Mar. 10, 2016  (TW) .............................. 105107329 A

(51) Int. Cl.
| | | |
|---|---|---|
| C08K 5/5399 | (2006.01) | |
| C08K 3/36 | (2006.01) | |
| C08K 13/02 | (2006.01) | |
| C08K 3/00 | (2018.01) | |
| C08K 5/00 | (2006.01) | |
| C08K 5/14 | (2006.01) | |
| C08K 5/3492 | (2006.01) | |
| B32B 15/04 | (2006.01) | |
| B32B 27/04 | (2006.01) | |
| B32B 15/08 | (2006.01) | |
| B32B 27/06 | (2006.01) | |
| B32B 33/00 | (2006.01) | |
| H05K 1/03 | (2006.01) | |
| C08J 5/24 | (2006.01) | |
| C08L 25/10 | (2006.01) | |
| C08L 47/00 | (2006.01) | |
| C08L 53/02 | (2006.01) | |
| C08L 71/12 | (2006.01) | |
| C08L 85/02 | (2006.01) | |
| C08J 5/10 | (2006.01) | |
| C08K 3/016 | (2018.01) | |
| B32B 5/26 | (2006.01) | |
| B32B 7/04 | (2006.01) | |
| B32B 15/12 | (2006.01) | |
| B32B 15/14 | (2006.01) | |
| B32B 15/20 | (2006.01) | |

(52) U.S. Cl.
CPC .............. C08K 5/5399 (2013.01); B32B 5/26 (2013.01); B32B 7/04 (2013.01); B32B 15/08 (2013.01); B32B 15/12 (2013.01); B32B 15/14 (2013.01); B32B 15/20 (2013.01); B32B 27/06 (2013.01); C08J 5/10 (2013.01); C08J 5/24 (2013.01); C08K 3/016 (2018.01); C08K 3/36 (2013.01); C08K 5/0066 (2013.01); C08L 25/10 (2013.01); C08L 47/00 (2013.01); C08L 53/02 (2013.01); C08L 71/12 (2013.01); C08L 85/02 (2013.01); B32B 2250/02 (2013.01); B32B 2250/40 (2013.01); B32B 2260/023 (2013.01); B32B 2260/046 (2013.01); B32B 2262/062 (2013.01); B32B 2262/101 (2013.01); B32B 2307/306 (2013.01); B32B 2307/3065 (2013.01); B32B 2307/7246 (2013.01); B32B 2307/73 (2013.01); B32B 2307/748 (2013.01); B32B 2457/08 (2013.01); C08J 2371/00 (2013.01); C08J 2375/00 (2013.01); C08J 2375/04 (2013.01); C08J 2379/08 (2013.01)

(58) Field of Classification Search
CPC .... C08K 5/0066; C08K 5/5399; C08K 3/016; C08J 5/24; C08J 2371/12; C08L 71/12; C08L 53/02; C08L 47/00; C08L 25/10; C08L 85/02; C09D 171/12; C09D 153/02; C09D 147/00; C09D 125/10; C09D 185/02; C09J 171/12; C09J 153/02; C09J 147/00; C09J 125/10; C09J 185/02; B32B 15/08; B32B 15/12; B32B 15/14; B32B 15/20; B32B 7/04; B32B 27/06; B32B 5/26

See application file for complete search history.

(56) References Cited

U.S. PATENT DOCUMENTS

| | | | |
|---|---|---|---|
| 3,900,444 A | 8/1975 | Racky et al. | |
| 6,518,336 B1* | 2/2003 | Yabuhara ............. | C08K 5/5399 524/116 |
| 6,596,893 B2 | 7/2003 | Nakacho et al. | |

(Continued)

FOREIGN PATENT DOCUMENTS

| | | |
|---|---|---|
| CN | 103319877 A | 9/2013 |
| CN | 104169343 A | 11/2014 |

(Continued)

OTHER PUBLICATIONS

ASTM International, ASTM D150-11.*
Office Action in Chinese counterpart application, dated Oct. 26, 2018.

*Primary Examiner* — Kregg T Brooks
(74) *Attorney, Agent, or Firm* — Michael W. Ferrell; Ferrells, PLLC; Anna L. Kinney

(57) ABSTRACT

A resin composition, comprising the following components:
(a) a thermal-curable resin system, which has a dielectric loss (Df) of not higher than 0.004 at 10 GHz; and
(b) an alkenyl phenoxy phosphazene component,
wherein the amount of the component (b) is 1 wt % to 30 wt % based on the total weight of the resin system (a) and the component (b).

16 Claims, No Drawings

(56) References Cited

U.S. PATENT DOCUMENTS

| | | | |
|---|---|---|---|
| 6,797,750 B2* | 9/2004 | Taniguchi | C08G 59/4071 |
| | | | 257/E23.007 |
| 8,063,245 B2 | 11/2011 | Okada et al. | |
| 2005/0042466 A1 | 2/2005 | Ohno | |
| 2005/0064159 A1 | 3/2005 | Amou | |
| 2013/0252003 A1 | 9/2013 | Liu | |
| 2014/0349090 A1 | 11/2014 | Hsieh | |
| 2015/0044484 A1* | 2/2015 | Ito | B32B 15/08 |
| | | | 428/457 |
| 2016/0272812 A1* | 9/2016 | Zhou | C08L 69/00 |
| 2017/0158854 A1* | 6/2017 | Ueno | C08L 71/126 |
| 2017/0327683 A1* | 11/2017 | Hu | C08L 63/00 |

FOREIGN PATENT DOCUMENTS

| | | | | |
|---|---|---|---|---|
| CN | 104725781 A | 6/2015 | | |
| TW | 200514805 A | 5/2005 | | |
| TW | 200519158 A | 6/2005 | | |
| TW | 201428055 A | 7/2014 | | |
| TW | 201444909 A | 12/2014 | | |
| WO | 2015069642 A1 | 5/2015 | | |
| WO | WO-2015133292 A1 * | 9/2015 | | B32B 15/08 |

* cited by examiner

RESIN COMPOSITION AND USES OF THE SAME

CLAIM FOR PRIORITY

This application claims the benefit of Taiwan Patent Application No. 105107329 filed on Mar. 10, 2016, the subject matter of which is incorporated herein in its entirety by reference.

BACKGROUND OF THE INVENTION

Field of the Invention

The present invention relates to a resin composition, especially a resin composition comprising an alkenyl phenoxy phosphazene component. The present invention also relates to a prepreg and laminate provided by using the resin composition.

Descriptions of the Related Art

Printed circuit boards (PCBs) are circuit substrates that are used for electronic devices to load other electronic components and to electrically connect the components to provide a stable circuit working environment. One kind of conventional printed circuit board is a copper clad laminate (CCL), which is primarily composed of resin(s), reinforcing material(s) and copper foil(s). Examples of resins include epoxy resins, phenolic resins, polyamine formaldehyde resins, silicone resins, and Teflon; and examples of reinforcing materials include glass fiber cloths, glass fiber mats, insulating papers, and linen cloths.

In general, a printed circuit board can be prepared by using the following method: immersing a reinforcing material such as a glass fiber fabric into a resin (such as epoxy resin), and curing the immersed glass fiber fabric into a half-cured state, i.e., B-stage, to obtain a prepreg; superimposing certain layers of the prepregs and superimposing a metal foil on at least one external surface of the superimposed prepregs to provide a superimposed object; hot-pressing the superimposed object, i.e., C-stage, to obtain a metal clad laminate; etching the metal foil on the surface of the metal clad laminate to form a defined circuit pattern; and finally, drilling a plurality of holes on the metal clad laminate and plating these holes with a conductive material to form via holes to accomplish the preparation of the printed circuit board.

In many applications, resin materials require good flame retardance. In some cases, a resin with a flame resistance property such as a halogenated polymer is sufficient to provide the desired flame retardance. If the flame retardance of a resin is insufficient to provide the desired flame retardance, it would be necessary to add a flame retardant into the resin. Known compounds capable of being used as flame retardants include inorganic hydroxides, organic phosphorous compounds, organic halogen compounds, halogen-containing organic phosphorous compounds, etc. However, during the curing process of a resin containing a halogen-containing compound, the halogen-containing compound will generate hydrogen halides through thermal decomposition, and the generated hydrogen halides will corrode molds and adversely affect the properties of the resin and cause discoloration of the resin. Similarly, during the recycling process (e.g., incineration processing) of the product of the cured resin, the halogen-containing compounds will generate biological hazard gases such as hydrogen halides. Hence, halogen-containing compounds do not meet current environmental protection requirements, and halogen-free flame retardants are much in demand.

Phosphorous-containing compounds are one of the most popular halogen-free flame retardants. Examples of phosphorous-containing compounds include triphenyl phosphate (TPP), tricresyl phosphate (TCP), and the like. However, such phosphorous-containing compounds are generally in the form of a liquid or a solid with a low melting point under room temperature and are volatile substances. Hence, they tend to lower the curing temperature of the resins in which they are applied, and cause caking and leakage problems during fluxing.

Applications of phosphorous-containing compounds as flame retardant have been disclosed in many patent documents. U.S. Pat. No. 3,900,444 uses alkali salts of phosphoric acids as flame retardants for polyesters; however, if such phosphorous-containing compounds are applied into resin compositions for preparing printed circuit boards, they tend to adversely affect properties, such as the dielectric constant (Dk), dielectric loss (Df), thermal resistance, moisture resistance and electrical erosion resistance of the laminates thus prepared. U.S. Pat. No. 6,596,893 discloses a phenoxyphosphazene compound used in thermoplastic resins or thermoset resins. U.S. Pat. No. 8,063,245 discloses a phosphazene compound used in photosensitive resins composition. WO 2015/069642 discloses a phosphazene polycarbonate compounds retardant.

SUMMARY OF THE INVENTION

An objective of the present invention is to provide a resin composition, comprising the following:
(a) a thermal-curable resin system, which has a dielectric loss (Df) not higher than 0.004 at 10 GHz; and
(b) an alkenyl phenoxy phosphazene component,
wherein the amount of the component (b) is 1 wt % to 30 wt % based on the total weight of the resin system (a) and the component (b).

Another objective of the present invention is to provide a prepreg, which is prepared by immersing a substrate into the resin composition described above, and drying the immersed substrate.

Yet another objective of the present invention is to provide a laminate, comprising a synthetic layer and a metal layer, wherein the synthetic layer is made from the prepreg described above.

To render the above objectives, the technical features and advantages of the present invention more apparent, the present invention will be described in detail with reference to some embodiments hereinafter.

BRIEF DESCRIPTION OF THE DRAWINGS

Not applicable.

DESCRIPTION OF THE PREFERRED EMBODIMENT

Hereinafter, some embodiments of the present invention will be described in detail. However, without departing from the spirit of the present invention, the present invention may be embodied in various embodiments and should not be limited to the embodiments described in the specification. Furthermore, for clarity, the size of each element and each area may be exaggerated in the appended drawings and not depicted in actual proportion. Unless it is additionally explained, the expressions "a," "the," or the like recited in the specification (especially in the claims) should include both the singular and the plural forms. Furthermore, unless it is additionally explained, while describing the constituents in the solution, mixture and composition in the specification, the amount of each constituent is calculated based on the solid content, i.e., regardless of the weight of the solvent.

The present invention relates to a resin composition with excellent flame retardance. In the resin composition, a resin system with specific electrical properties and a specific phosphazene component are used in combination at a specific ratio so that laminates prepared thereby could be provided with satisfactory physicochemical properties and excellent flame retardance, heat resistance and peeling strength without adversely affecting their electrical properties.

Specifically, the resin composition of the present invention comprises (a) a thermal-curable resin system and (b) an alkenyl phenoxy phosphazene component, wherein the thermal-curable resin system (a) has a dielectric loss (Df) not higher than 0.004 at 10 GHz.

In the resin composition of the present invention, the phosphazene component (b) is provided with alkenyl phenoxy group(s), and the phosphazene component (b) contributes to not only a flame retardance but also electrical properties, physicochemical properties, and mechanical properties of the laminates prepared from the resin composition. The amount of the alkenyl phenoxy phosphazene component (b) is 1 wt % to 30 wt %, preferably 10 wt % to 22 wt % based on the total weight of the resin system (a) and the component (b). If the amount of the alkenyl phenoxy phosphazene component (b) is higher than the designated range (e.g., higher than 30 wt %), the mechanical properties of laminates, especially the peeling strength of the laminates thus prepared, will be adversely affected. On the other hand, if the amount of the alkenyl phenoxy phosphazene component (b) is lower than the designated range (e.g., lower than 1 wt %) or the resin composition does not comprise the alkenyl phenoxy phosphazene component (b), the laminates thus prepared will be deficient in the electrical properties, physicochemical properties and mechanical properties, especially in the peeling strength and glass transition temperature (Tg).

Examples of the alkenyl phenoxy phosphazene component (b) include a cyclic alkenyl phenoxy phosphazene of formula (I), a linear alkenyl phenoxy phosphazene of formula (II), or a combination thereof. In some embodiments of the present invention, a combination of a cyclic alkenyl phenoxy phosphazene of formula (I) and a linear alkenyl phenoxy phosphazene of formula (II) is used.

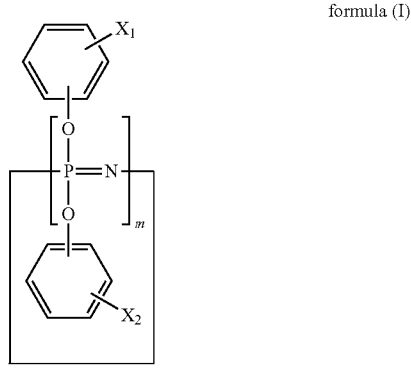

formula (I)

formula (II)

In formulas (I) and (II), $X_1$ is alkenyl, preferably vinyl or allyl; $X_2$ is H or alkenyl, preferably H; m is an integer from 3 to 25; n is an integer from 3 to 1000; A is $-N=P(OC_6H_5)_3$ or $-N=P(O)OC_6H_5$; and B is $-P(OC_6H_5)_4$ or $-P(O)(OC_6H_5)_2$.

It is known that "thermal-curable resins" refer to polymers that can be gradually cured by forming a network structure through a heat treatment. In the resin composition of the present invention, the thermal-curable resin system can be provided by a single thermal-curable resin or be provided by multiple thermal-curable resins through mixing. Regardless of using a single thermal-curable resin or a mixture of multiple thermal-curable resins, the dielectric loss (Df) of the thermal-curable resin component thus obtained is not higher than 0.004 at 10 GHz.

Specifically, the thermal-curable resin system (a) of the resin composition according to the present invention may be provided by using a thermal-curable resin selected from the group consisting of polyphenylene ether resins containing carbon-carbon double bond(s), bismaleimide resins, elastomers containing butadiene and/or styrene, and isocyanurates containing vinyl and/or allyl. Alternatively, the thermal-curable resin system (a) may be provided by any combinations of the above thermal-curable resins. Yet alternatively, the thermal-curable resin system (a) may be provided by further combining at least one of the above thermal-curable resins with other known thermal-curable resins; however, in this case, it should be noted and maintained that the Df value of the thermal-curable resin system obtained therefrom cannot be higher than 0.004 at 10 GHz.

Suitable polyphenylene ether resins containing carbon-carbon double bond(s) include but are not limited to polyphenylene ether resins with acrylic acid group(s), polyphenylene ether resins with vinyl group(s), and polyphenylene ether resins with hydroxyl group(s). For example, polyphenylene ether resins containing carbon-carbon double bond(s) may be a polyphenylene ether resin of formula (III):

formula (III)

In formula (III),
X and Y are independently

an alkenyl-containing group or absent, and it is preferred that X and Y are independently absent or

or X has the structure of formula (III-1) and Y has the structure of formula (III-2):

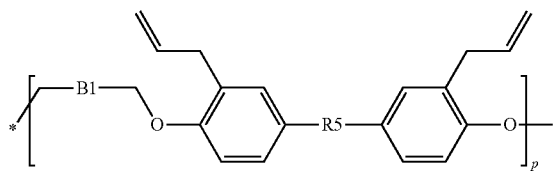

formula (III-1)

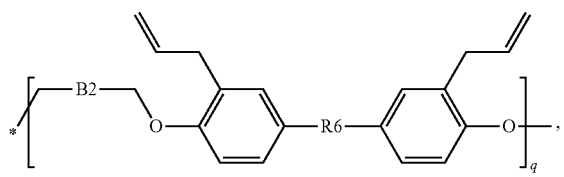

formula (III-2)

in formulas (III-1) and (III-2),
* indicates the end connecting oxygen (—O—) of formula (III);
B1 and B2 are independently

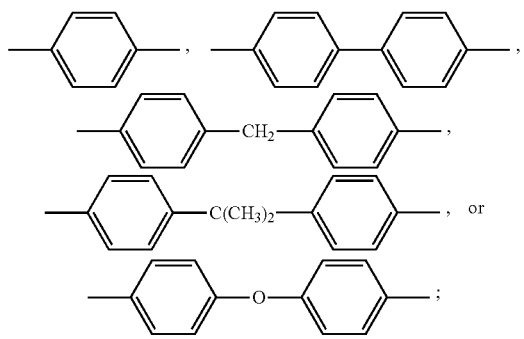

R5 and R6 are independently —O—, —SO$_2$—, or —C(CH$_3$)$_2$—, or absent; and
p and q are independently an integer, and $1 \leq p+q < 20$, preferably $1 \leq p+q < 10$, and more preferably $1 \leq p+q < 3$;
R1, R2, R3 and R4 are independently H or substituted or unsubstituted C$_1$-C$_5$ alkyl;
m1 and n1 are independently an integer from 0 to 100, with the proviso that m1 and n1 are not 0 at the same time, and the range of m1 and n1 is preferably $1 \leq (m1+n1) \leq 100$, and more preferably $5 \leq (m1+n1) \leq 30$;
A1 and A2 are independently

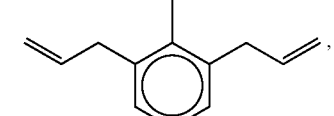

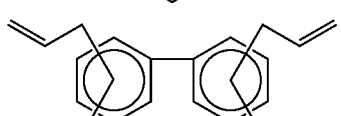

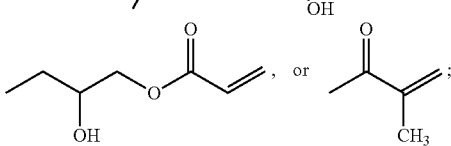

and
Z is absent, —O—,

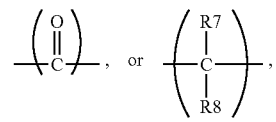

wherein R7 and R8 are independently H or C$_1$-C$_{12}$ alkyl.
Suitable bismaleimide resins may have the structure of formula (IV).

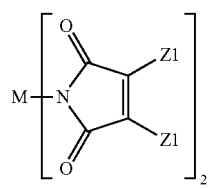

formula (IV)

In formula (IV), M is a C2-C40 divalent group and is an aliphatic, alicyclic, aromatic, or heterocyclic. It is preferred that M is substituted or unsubstituted methylene (—CH$_2$—),

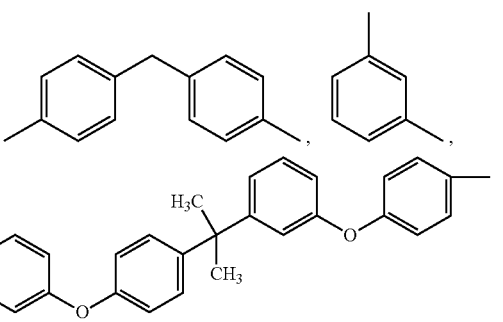

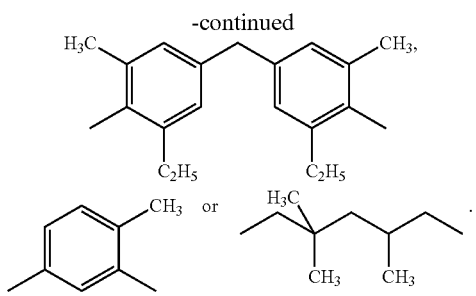

The Z1 groups are independently H, halogen, or C1-C5 alkyl. In some embodiments of the present invention, M is

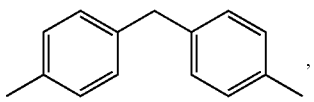

and both Z1 groups are H.

Specific examples of bismaleimide resins include but are not limited to 1,2-bismaleimidoethane, 1,6-bismaleimidohexane, 1,3-bismaleimidobenzene, 1,4-bismaleimidobenzene, 2,4-bismaleimidotoluene, 4,4'-bismaleimidodiphenylmethane, 4,4'-bismaleimidodiphenylether, 3,3'-bismaleimidodiphenylsulfone, 4,4'-bismaleimidodiphenylsulfone, 4,4'-bismaleimidodicyclohexylmethane, 3,5-bis(4-maleimidophenyOpyridine, 2,6-bismaleimidopyridine, 1,3-bis(maleimidomethyl)cyclohexane, 1,3-bis(maleimidomethyObenzene, 1,1-bis(4-maleimidophenyl)cyclohexane, 1,3-bis(dichloromaleimido)benzene, 4,4'-biscitraconimidodiphenylmethane, 2,2-bis(4-maleimidophenyl)propane, 1-phenyl-1,1-bis(4-maleimidophenyl)ethane, α,α-bis(4-maleimidophenyl)toluene, 3,5-bismaleimido-1,2,4-triazole, N,N'-ethylenebismaleimide, N,N'-hexamethylenebismaleimide, N,N'-m-phenylenebismaleimide, N,N'-p-phenylenebismaleimide, phenylmethanebismaleimide, N,N'-4,4'-diphenyletherbismaleimide, N,N'-4,4'-diphenylsufonebismaleimide, N,N'-4,4'-dicyclohexylmethanebismaleimide, N,N'-α,α'-4,4'-dimethylenecyclohexane bismaleimide, N,N'-m-xylenebismaleimide, N,N'-4,4'-diphenylcyclohexanebismaleimide, N,N'-methylenebis(3-chloro-p-phenylene)bismaleimide, and combinations thereof.

Suitable elastomers containing butadiene and/or styrene include but are not limited to homopolymers of butadiene, styrene-butadiene copolymers (SBR), styrene-butadiene-styrene copolymers (SBS), acrylonitrile-butadiene copolymers, hydrogenated styrene-butadiene-styrene copolymers, styrene-isoprene-styrene copolymers (SIS), hydrogenated styrene-isoprene-styrene copolymers, hydrogenated styrene (butadiene/isoprene) styrene copolymers, polystyrene, and combinations thereof. In some embodiments of the present invention, homopolymers of butadiene, styrene-butadiene copolymers, styrene-butadiene-styrene copolymers, or combinations thereof are used.

Examples of isocyanurates containing vinyl and/or allyl include but are not limited to triallyl isocyanurate (TAIC), triallyl cyanurate (TAC), and a combination thereof. In some embodiments of the present invention, triallyl isocyanurate (TAIC) is used.

In addition to the above illustrated resins, the resin system (a) may optionally comprise other thermal-curable resins, such as phenolic resins, styrene maleic anhydride (SMA) resins or combinations thereof, with the proviso that the designated condition of dielectric loss (Df) is not violated. The other thermal-curable resins may further have reactive functional group(s). The "reactive functional group" in the context may be any groups capable of conducting a curing reaction, such as hydroxyl groups, carboxyl groups, alkenyl groups, amino groups, and the like, but are not limited thereto.

Catalysts may be optionally added into the resin system (a) to promote the proceeding of reactions. Examples of catalysts include but are not limited to dicumyl peroxide (DCP), α,α'-bis(t-butylperoxy)diisopropyl benzene, benzoyl peroxide (BPO), and combinations thereof. Persons with ordinary skill in the art may select suitable catalysts and determine the amount of the selected catalysts based on their ordinary skill and the disclosure of the subject application. Since these selections and determinations are not critical to the present invention, they will not be discussed in detail herein.

The resin composition of the present invention may optionally further comprise other additives well-known to persons with ordinary skill in the art, such as curing promoters, flame retardants, fillers, dispersing agents, flexibilizers, etc., in addition to the resin system (a) and the alkenyl phenoxy phosphazene component (b). The curing promoters may promote the curing of the resin composition. The flame retardants may enhance the flame retardance of the material prepared thereby. The fillers may improve particular physicochemical properties of the material prepared thereby.

Examples of flame retardants include but are not limited to phosphorus-containing flame retardants, bromine-containing flame retardants, and combinations thereof. Examples of phosphorus-containing flame retardants include phosphatides, phosphazenes, ammonium polyphosphates, melamine polyphosphates, and melamine cyanurates. Examples of bromine-containing flame retardants include tetrabromobisphenol A, decabromodiphenyloxide, decabrominated diphenyl ethane, 1,2-bis(tribromophenyl)ethane, brominated epoxy oligomer, octabromotrimethylphenyl indane, bis(2,3-dibromopropyl ether), tris(tribromophenyl)triazine, brominated aliphatic or aromatic hydrocarbon.

Examples of fillers include but are not limited to silica, aluminum oxide, magnesium oxide, magnesium hydroxide, calcium carbonate, talc, clays, aluminum nitride, boron nitride, aluminum hydroxide, silicon aluminum carbide, silicon carbide, sodium carbonate, titanium dioxide, zinc oxide, zirconium oxide, quartzes, diamonds, diamond-like carbon, graphites, calcined kaolin, pryan, micas, hydrotalcite, hollow silica, polytetrafluoroethylene (PTFE) powders, glass beads, ceramic whiskers, carbon nanotubes, nanosized inorganic powders, and combinations thereof.

As for the amount of each of the above additives, it is not particularly limited and can be determined depending on the needs by persons with ordinary skill in the art in accordance with their ordinary skill and disclosure of the present specification.

Regarding the preparation of the resin composition of the present invention, the resin composition may be prepared into varnish form for subsequent applications by evenly mixing the resin system (a), the alkenyl phenoxy phosphazene component (b) and other optional additives through a stirrer and dissolving or dispersing the obtained mixture into a solvent. The solvent here can be any inert solvent which can dissolve (or disperse) but not react with the components of the resin composition of the present invention. For example, solvents which can dissolve or disperse the resin system (a) of the present invention include but are not limited to toluene, γ-butyrolactone, methyl ethyl ketone, cyclohexanone, butanone, acetone, xylene, methyl isobutyl ketone, N,N-dimethylformamide (DMF), N,N-dimethylacetamide (DMAc), N-methyl-pyrolidone (NMP), or mixtures thereof. The amount of the solvent is not particularly limited as long as the components of the resin composition can be evenly mixed. In some embodiments of the present invention, a mixture of toluene, methyl ethyl ketone and γ-butyrolactone is used as the solvent.

The present invention further provides a prepreg which is obtained by immersing a substrate (a reinforcing material) into the abovementioned resin composition and drying the immersed substrate. Conventional reinforcing materials include glass fiber cloths (glass fabrics, glass papers, glass mats, etc.), kraft papers, short fiber cotton papers, nature fiber cloths, organic fiber cloths, etc. In some embodiments of the present invention, 2116 glass fiber cloths are illustrated as the reinforcing materials, and the reinforcing materials are heated and dried at 175° C. for 2 to 15 minutes (B-stage) to provide half-hardened prepregs.

The present invention further provides a laminate, which comprises a synthetic layer and a metal layer, wherein the synthetic layer is made from the above prepregs. The laminate may be prepared by the following process: superimposing a plurality of prepregs and superimposing a metal foil (such as a copper foil) on at least one external surface of the superimposed prepregs to provide a superimposed object; performing a hot-pressing operation onto the superimposed object to obtain the laminate. Moreover, a printed circuit board can be obtained by further patterning the metal foil of the laminate.

The present invention will be further illustrated by the embodiments hereinafter, wherein the measuring instruments and methods are respectively as follows:

[Water Absorption Test]

The moisture resistance of the laminate is tested by a pressure cooker test (PCT), i.e., subjecting the laminate into a pressure container (121° C., 100% R.H. and 1.2 atm) for 2 hours.

[Solder Resistance Test]

The solder resistance test is carried out by immersing the dried laminate in a solder bath at 288° C. for a while and observing whether there is any defect such as delamination and expansion.

[Peeling Strength Test]

Peeling strength refers to the bonding strength between the metal foil and laminated prepreg, and which is usually expressed by the force required for vertically peeling the clad copper foil with a width of ⅛ inch from the surface of the laminated prepreg.

[Glass Transition Temperature (Tg) Test]

Glass transition temperature (Tg) is measured by using a Differential Scanning calorimeter (DSC), wherein the measuring methods are IPC-TM-650.2.4.25C and 24C testing method of the Institute for Interconnecting and Packaging Electronic Circuits (IPC).

[Flame Retardance Test]

The flame retardance test is carried out according to UL94V (Vertical Burn), which comprises the burning of a laminate, which is held vertically, using a Bunsen burner to compare its self-extinguishing properties and combustion-supporting properties.

[Dielectric Constant and Dissipation Factor Measurement]

Dk and Df are measured according to ASTM D150 under an operating frequency of 10 GHz.

EXAMPLE

Preparation of Resin System (a)

Resin System (a1)

According to the ratio shown in Table 1, polyphenylene ether resin of formula (III) (X has the structure of formula (III-1), Y has the structure of formula (III-2), wherein B1 and B2 are

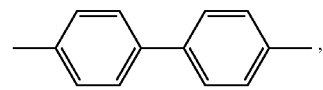

R5 and R6 are absent, and 1≤p+q<3, R1, R2, R3, and R4 are methyl, A1 and A2 are

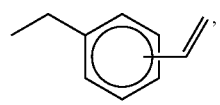

Z is absent, and 20≤(m1+n1)≤25; trade name: PP807, available from Jin-Yi Company) and benzoyl peroxide (BPO, available from Fluka Company) as the catalyst were mixed under room temperature with a stirrer followed by adding toluene, methyl ethyl ketone and γ-butyrolactone (all available from Fluka Company) thereinto. After stirring the resultant mixture under room temperature for about 60 to 120 minutes, resin system (a1) was obtained.

Resin System (a2)

According to the ratio shown in Table 1, polyphenylene ether resin (available from Sabic Company (trade name: SA9000)), polyphenylene ether resin (available from Mitsubishi Gas Chemical Company (trade name: OPE-2st)), and TAIC (available from Evonik Company) as the isocyanurate, and BPO as the catalyst were mixed under room temperature with a stirrer followed by adding toluene, methyl ethyl ketone and γ-butyrolactone thereinto. After stirring the resultant mixture under room temperature for about 60 to 120 minutes, resin system (a2) was obtained.

Resin System (a3)

The preparation procedures of resin system (a1) were repeated to prepare resin system (a3), except that polyphenylene ether resin PP807 was substituted by polyphenylene ether resin SA9000, bismaleimide resin of formula (IV) (M is

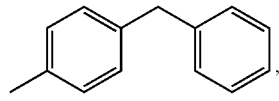

and the Z1 groups are H; trade name: BMI, available from K.I CHEMICAL Company) were further added, and the amount of the catalyst was adjusted as shown in Table 1.

Resin System (a4)

The preparation procedures of resin system (a2) were repeated to prepare resin system (a4), except that bismaleimide resin BMI, and butadiene-styrene random copolymer (trade name: Ricon 100, available from CRAY VALLEY Company), homopolymer of butadiene (trade name: Ricon 150, available from CRAY VALLEY Company), and styrene-butadiene-styrene copolymer (trade name: D1118K, available from KRATON Company) as the elastomers were further added, and the amount of the isocyanurate TAIC was adjusted as shown in Table 1.

Resin System (a5)

According to the ratio shown in Table 1, the isocyanurate TAIC, butadiene-styrene random copolymer Ricon 100 and styrene-butadiene-styrene copolymer D1118K as the elastomers, and BPO as the catalyst were mixed under room temperature with a stirrer followed by adding toluene, methyl ethyl ketone and γ-butyrolactone thereinto. After stirring the resultant mixture under room temperature for about 60 to 120 minutes, resin system (a5) was obtained.

In order to measure the Df values of the resin systems, electromeric samples were prepared by using resin systems (a1) to (a5), respectively. Resin systems (a1) to (a5) were coated on copper foils by a horizontal knife of horizontal coater, respectively, and the coated copper foils were then placed in an oven and dried at 175° C. for 2 to 10 minutes to prepare resin coated copper foils in a half-cured state. Next, a hot-pressing operation was performed on each of the resin coated copper foils (in a half-cured state) with a further sheet of copper foil (0.5 oz.), herein, the hot-pressing conditions are as follows: raising the temperature to about 200° C. to 220° C. with a heating rate of 3.0° C./min, and hot-pressing for 180 minutes under the full pressure of 15 kg/cm$^2$ (initial pressure is 8 kg/cm$^2$) at said temperature. Then, the Df values of resin systems (a1) to (a5) were measured at 10 GHz. As shown in Table 1, the Df values of resin systems (a1) to (a5) at 10 GHz are all lower than 0.004.

Preparation of Resin Composition

Example 1

According to the ratio shown in Table 2, resin system (a1) as the resin system (a), alkenyl phenoxy phosphazene (trade name: SPV100, available from Otsuka Chemical Company) as the alkenyl phenoxy phosphazene component (b), and silica powders (available from Sibelco Company) as the filler were mixed under room temperature with a stirrer for about 120 minutes to obtain resin composition 1.

Example 2

The preparation procedures of Example 1 were repeated to prepare resin composition 2, except that resin system (a2) was used as the resin system (a), and the amount of the alkenyl phenoxy phosphazene component (b) was adjusted as shown in Table 2.

Example 3

The preparation procedures of Example 2 were repeated to prepare resin composition 3, except that SPB100 (available from Otsuka Chemical Company) as the flame retardant was further added, and the amount of the alkenyl phenoxy phosphazene component (b) was adjusted as shown in Table 2.

Example 4

The preparation procedures of Example 1 were repeated to prepare resin composition 4, except that resin system (a3) was used as the resin system (a), and the amount of the alkenyl phenoxy phosphazene component (b) was adjusted as shown in Table 2.

Example 5

The preparation procedures of Example 4 were repeated to prepare resin composition 5, except that the flame retardant SPB100 was further added, and the amount of the alkenyl phenoxy phosphazene component (b) was adjusted as shown in Table 2.

TABLE 1 composition of resin systems

| parts by weight | | resin system | | | | |
| --- | --- | --- | --- | --- | --- | --- |
| | | (a1) | (a2) | (a3) | (a4) | (a5) |
| polyphenylene ether resin | PP807 | 60 | — | — | — | — |
| | SA9000 | — | 30 | 60 | 30 | — |
| | OPE-2st | — | 30 | — | 30 | — |
| bismaleimide resin | BMI | — | — | 10 | 5 | — |
| isocyanurate | TAIC | — | 15 | — | 20 | 8 |
| elastomer | Ricon 150 | — | — | — | 10 | — |
| | Ricon 100 | — | — | — | 5 | 40 |
| | D1118K | — | — | — | 5 | 5 |
| catalyst | BPO | 0.6 | 0.3 | 0.3 | 0.3 | 0.8 |
| Df@10 GHz | | 0.0030 | 0.0031 | 0.0033 | 0.0028 | 0.0027 |

Example 6

The preparation procedures of Example 1 were repeated to prepare resin composition 6, except that resin system (a4) was used as the resin system (a), and the amounts of the alkenyl phenoxy phosphazene component (b) and the filler were adjusted as shown in Table 2.

Example 7

The preparation procedures of Example 6 were repeated to prepare resin composition 7, except that the flame retardant SPB100 was further added, and the amount of the alkenyl phenoxy phosphazene component (b) was adjusted as shown in Table 2.

Example 8

The preparation procedures of Example 1 were repeated to prepare resin composition 8, except that resin system (a5) was used as the resin system (a), and the amount of the alkenyl phenoxy phosphazene component (b) was adjusted as shown in Table 2.

Comparative Example 1

The preparation procedures of Example 2 were repeated to prepare comparative resin composition 1, except that the amount of the alkenyl phenoxy phosphazene component (b) was adjusted to exceed the range (1 to 30 wt %) designated by the present invention as shown in Table 2.

Comparative Example 2

The preparation procedures of Example 6 were repeated to prepare comparative resin composition 2, except the alkenyl phenoxy phosphazene component (b) was not added, flame retardant SPB100 was further added, and the amount of the filler was adjusted as shown in Table 2.

TABLE 2

| | | resin system (a) | alkenyl phenoxy phosphazene component (b) (SPV100) (parts by weight) | flame retardant (SPB100) (parts by weight) | silica powder (parts by weight) |
|---|---|---|---|---|---|
| Example | 1 | (a1) | 13 | — | 25 |
| | 2 | (a2) | 15 | — | 25 |
| | 3 | (a2) | 5 | 10 | 25 |
| | 4 | (a3) | 12 | — | 25 |
| | 5 | (a3) | 11 | 3 | 25 |
| | 6 | (a4) | 18 | — | 30 |
| | 7 | (a4) | 16 | 5 | 30 |
| | 8 | (a5) | 18 | — | 25 |
| Comparative Example | 1 | (a2) | 35 | — | 25 |
| | 2 | (a4) | — | 45 | 25 |

[Preparation of Laminate]

Laminates 1 to 8 and comparative laminates 1 and 2 were prepared by using the resin compositions 1 to 8 and comparative resin compositions 1 and 2, respectively. In detail, one of the resin compositions was coated on 2116 reinforced glass fiber cloths by a roller. The coated 2116 reinforced glass fiber cloths were then placed in an oven and dried at 175° C. for 2 to 15 minutes to produce prepregs in a half-cured state (resin content: about 53%). Four pieces of the prepregs were superimposed and two sheets of copper foil (0.5 oz.) were respectively superimposed on the two external surfaces of the superimposed prepregs to provide a superimposed object. A hot-pressing operation was performed on each of the prepared objects to provide the laminates 1 to 8 (corresponding to the resin compositions 1 to 8, respectively) and comparative laminates 1 and 2 (corresponding to the comparative resin compositions 1 and 2, respectively). Herein, the hot-pressing conditions are as follows: raising the temperature to about 200° C. to 220° C. with a heating rate of 3.0° C./min, and hot-pressing for 180 minutes under the full pressure of 15 kg/cm² (initial pressure is 8 kg/cm²) at said temperature.

The water absorption, solder resistance, peeling strength, glass transition temperature (Tg), flame retardance, dielectric constant (Dk), dissipation factor (Df) of the laminates 1 to 8 and comparative laminates 1 and 2 were analyzed and the results are tabulated in Table 3.

TABLE 3

| | | water absorption % | solder resistance minute | peeling strength pound/inch | Tg ° C. | flame retardance UL grade | Dk 10 GHz | Df 10 GHz |
|---|---|---|---|---|---|---|---|---|
| laminate | 1 | 0.40 | >10 | 3.86 | 198 | V0 | 0.0050 | 3.89 |
| | 2 | 0.39 | >10 | 3.90 | 197 | V0 | 0.0048 | 3.87 |
| | 3 | 0.42 | >10 | 3.85 | 194 | V0 | 0.0049 | 3.88 |
| | 4 | 0.41 | >10 | 3.72 | 217 | V0 | 0.0051 | 3.90 |
| | 5 | 0.42 | >10 | 3.67 | 212 | V0 | 0.0052 | 3.90 |
| | 6 | 0.43 | >10 | 4.20 | 207 | V0 | 0.0044 | 3.85 |
| | 7 | 0.44 | >10 | 4.15 | 203 | V0 | 0.0045 | 3.86 |
| | 8 | 0.46 | >10 | 3.50 | 183 | V0 | 0.0038 | 3.80 |
| comparative laminate | 1 | 0.44 | >10 | 2.90 | 188 | V0 | 0.0055 | 3.95 |
| | 2 | 0.47 | >10 | 2.40 | 176 | V0 | 0.0059 | 3.97 |

As shown in Table 3, the laminates 1 to 8 manufactured by using the resin compositions of the present invention are provided with satisfactory physicochemical properties and electrical properties (such as water absorption, flame retardance, Dk, and Df) and outstanding heat resistance (high Tg and excellent solder resistance). Thus, the resin composition of the present invention can be more extensively used. In particular, the laminates prepared by using the resin composition of the present invention are provided with excellent peeling strength (reach 3.50 pounds/inch or more), and in the case where the amount of the alkenyl phenoxy phosphazene component (b) is in a preferred range, i.e., 10 wt % to 22 wt % (Examples 1, 2, and 4 to 7), the peeling strength of the resultant laminates is particularly excellent (reach 3.86 pounds/inch or more). Furthermore, as shown in Comparative Example 1, it is surprising that if the amount of the alkenyl phenoxy phosphazene component (b) exceeds the range designated by the present invention, even though the amount of the alkenyl phenoxy phosphazene component (b) is increased, the peeling strength of the resultant laminates will decrease sharply (only 2.90 pounds/inch). In addition, as shown in Comparative Example 2, when the alkenyl phenoxy phosphazene component (b) is not added into the resin composition, the physicochemical properties of the resultant laminates apparently become poor. Even though the flame retardance of the resultant laminates may reach V-0 grade in the presence of the other flame retardant, the glass transition temperature and peeling strength of the resultant laminates remain poor.

The above examples are used to illustrate the principle and efficacy of the present invention and show the inventive features thereof. People skilled in this field may proceed with a variety of modifications and replacements based on the disclosures and suggestions of the invention as described without departing from the principle and spirit thereof. Therefore, the scope of protection of the present invention is that as defined in the claims as appended.

What is claimed is:

1. A resin composition, comprising:
   (a) a thermal-curable resin system, capable of being cured to a cured product which has a dielectric loss (Df) of not higher than 0.004 at 10 GHz; and
   (b) an alkenyl phenoxy phosphazene component, wherein the component (b) is a combination of a cyclic alkenyl phenoxy phosphazene of formula (I) and a linear alkenyl phenoxy phosphazene of formula (II),

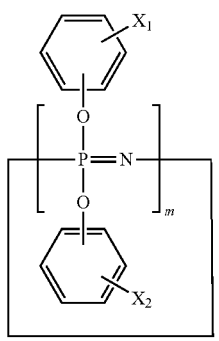

formula (I)

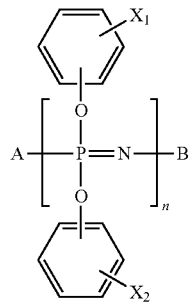

formula (II)

wherein $X_1$ is alkenyl, $X_2$ is H or alkenyl, m is an integer from 3 to 25, n is an integer from 3 to 1000, A is $-N=P(OC_6H_5)_3$ or $-N=P(O)OC_6H_5$, and B is $-P(OC_6H_5)_4$ or $-P(O)(OC_6H_5)_2$ and wherein the amount of the component (b) is 1 wt % to 30 wt % based on the total weight of the resin system (a) and the component (b).

2. The resin composition of claim 1, wherein the amount of the component (b) is 10 wt % to 22 wt % based on the total weight of the resin system (a) and the component (b).

3. The resin composition of claim 2, wherein the resin system (a) comprises thermal-curable resin(s) selected from the group consisting of polyphenylene ether resins containing carbon-carbon double bond(s), bismaleimide resins, elastomers containing butadiene and/or styrene, isocyanurates containing vinyl and/or allyl, and combinations thereof.

4. The resin composition of claim 1, wherein $X_1$ is vinyl or allyl, and $X_2$ is H.

5. The resin composition of claim 4, wherein the resin system (a) comprises thermal-curable resin(s) selected from the group consisting of polyphenylene ether resins containing carbon-carbon double bond(s), bismaleimide resins, elastomers containing butadiene and/or styrene, isocyanurates containing vinyl and/or allyl, and combinations thereof.

6. The resin composition of claim 1, wherein the resin system (a) comprises thermal-curable resin(s) selected from the group consisting of polyphenylene ether resins containing carbon-carbon double bond(s), bismaleimide resins, elastomers containing butadiene and/or styrene, isocyanurates containing vinyl and/or allyl, and combinations thereof.

7. The resin composition of claim 6, wherein the polyphenylene ether resins containing carbon-carbon double bond(s) have the structure of formula (III):

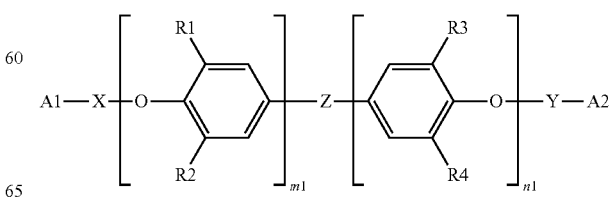

formula (III)

wherein X and Y are independently

an alkenyl-containing group or absent;

R1, R2, R3 and R4 are independently H or substituted or unsubstituted $C_1$-$C_5$ alkyl;

m1 and n1 are independently an integer from 0 to 100, with the proviso that m1 and n1 are not 0 at the same time;

A1 and A2 are independently

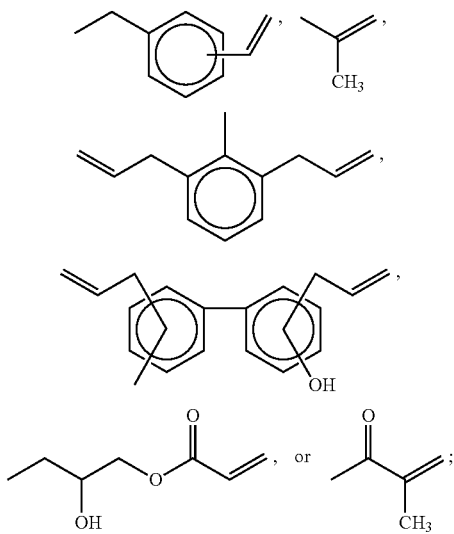

and

Z is absent, —O—,

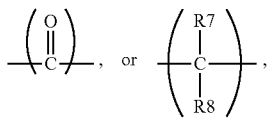

wherein R7 and R8 are independently H or $C_1$-$C_{12}$ alkyl.

8. The resin composition of claim 6, wherein the bismaleimide resins have the structure of formula (IV):

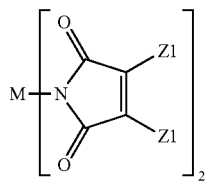

formula (IV)

wherein M is a $C_2$-$C_{40}$ divalent group and is aliphatic, alicyclic, aromatic, or heterocyclic, and the Z1 groups are independently H, halogen, or $C_1$-$C_5$ alkyl.

9. The resin composition of claim 6, wherein the elastomers containing butadiene and/or styrene are selected from the group consisting of styrene-butadiene copolymers (SBR), acrylonitrile-butadiene copolymers, styrene-butadiene-styrene copolymers (SBS), hydrogenated styrene-butadiene-styrene copolymers, styrene-isoprene-styrene copolymers (SIS), hydrogenated styrene-isoprene-styrene copolymers, hydrogenated styrene (butadiene/isoprene) styrene copolymers, polystyrene, and combinations thereof.

10. The resin composition of claim 6, wherein the isocyanurates containing vinyl and/or allyl are selected from the group consisting of triallyl isocyanurate (TAIC), triallyl cyanurate (TAC), and a combination thereof.

11. The resin composition of claim 1, wherein the resin system (a) further comprises a catalyst selected from the group consisting of dicumyl peroxide (DCP), α,α-bis(t-butylperoxy)diisopropyl benzene, benzoyl peroxide (BPO), and combinations thereof.

12. The resin composition of claim 1, further comprising one or more additives selected from the group consisting of curing promoters, flame retardants, fillers, dispersing agents, flexibilizers, and combinations thereof.

13. The resin composition of claim 12, wherein the flame retardants are selected from a group consisting of phosphorus-containing flame retardants, bromine-containing flame retardants, and combinations thereof.

14. The resin composition of claim 12, wherein the fillers are selected from the group consisting of silica, aluminum oxide, magnesium oxide, magnesium hydroxide, calcium carbonate, talc, clays, aluminum nitride, boron nitride, aluminum hydroxide, silicon aluminum carbide, silicon carbide, sodium carbonate, titanium dioxide, zinc oxide, zirconium oxide, quartzes, diamonds, diamond-like carbon, graphites, calcined kaolin, pryan, micas, hydrotalcite, hollow silica, polytetrafluoroethylene (PTFE) powders, glass beads, ceramic whiskers, carbon nanotubes, nanosized inorganic powders, and combinations thereof.

15. A prepreg, which is prepared by immersing a substrate into the resin composition of claim 1, and drying the immersed substrate.

16. A laminate, comprising a synthetic layer and a metal layer, wherein the synthetic layer is made from the prepreg of claim 15.

* * * * *